United States Patent Office 3,472,729
Patented Oct. 14, 1969

3,472,729
GLASS FIBER REINFORCED POLYOLEFIN
ARTICLE AND PROCESS THEREFOR
Samuel Sterman, Williamsville, and James G. Marsden, Tonawanda, N.Y., assignors to Union Carbide Corporation, a corporation of New York
No Drawing. Filed Feb. 1, 1966, Ser. No. 523,915
Int. Cl. D03d 11/00; B32b 17/02
U.S. Cl. 161—93                    9 Claims This invention is directed to glass-reinforced polyolefin resins.

Polyolefin resins include both polyethylene and polypropylene. These resins are thermoplastic and account for a relatively high percentage of the volume of the plastic materials of construction marketed. Polyethylene, available in various density classifications, is employed in the manufacture of sheets, films, tubes, pipe, blow-molded squeeze bottles, packaging tanks, battery tanks, etc. Similarly, polypropylene finds wide application in the manufacture of piping, valves, and the like.

While the thermoplastic polyolefin resins possess very desirable physical properties, and additional improvement thereof can be achieved by reinforcing these resins with strengthening materials such as glass in fibrous form, for example.

It has now been found that a further improvement in the physical properties of glass-reinforced polyolefin resins can be achieved by treating the fibrous glass, prior to its incorporation within the resin, with certain chemical compounds. Accordingly, it is the principal object of this invention to provide as a material of construction a polyolefin resin reinforced by fibrous glass and exhibiting materially enhanced physical properties while retaining its thermoplastic properties.

A further object of this invention is to provide a method for enhancing the physical properties of the polyolefin resins.

Still other objects will become apparent to one skilled in the art upon reference to the ensuing specification and the claims.

The objects of this invention are achieved by an article of manufacture which is a thermoplastic composite of fibrous glass, a polyolefin resin, and an organofuctional aliphatic trialkoxysilane which can be an (epoxycyloalkyl)alkyltrialkoxysilane, a glycidoxyalkyltrialkoxysilane, an (acryloxy)alkyltrialkoxysilane, an alkenyltrialkoxysilane, and an aminoalkyltrialkoxysilane, or a corresponding hydrolyzate of the foregoing.

The above article of manufacture, possessing the enhanced physical properties, can be prepared by (1) providing a fibrous glass substrate, (2) treating this substrate with the aforementioned organofunctional aliphatic trialkoxysilane, (3) intimately contacting the treated glass substrate with the polyolefin resin, and (4) thermoforming the resulting composite at a temperature below the decomposition temperature of the resin and the silane.

As pointed out above, the thermoplastic resin within the purview of the present invention can be polyethylene or polypropylene. The polyolefins are substantially fully polymerized, are chemically inert, and contain no apparent reaction sites. The resins may be thermoformed over and over again without undergoing further cure or hardening. Any residual unsaturation remaining in the resin after the polymerization of the corresponding olefin has been carried out is incidental and does not affect its thermoplastic nature.

The crux of the present invention lies in the selection of the proper organofuctional silane for the treatment of the fibrous glass employed for reinforcement of the resin. This selection must be carried out with great care since an improvident choice will work to the detriment of the physical properties of the ultimate article. Furthermore, considerable research into the reaction mechanisms involved has failed to cast sufficient light on the observed phenomena so as to enable the skilled artisan to make a reliable prediction of the preformance of a particular organofunctional silane in the selected resin system even on the basis or observed performance of silanes having closely related organofunctional groups.

The following groupings of organofunctional silanes have been found to materially enhance the physical properties of a polyolefin resin reinforced by fibrous glass: (a) an (epoxycycloalkyl)alkyltrialkoxysilane such as beta-(3,4-epoxycyclohexyl)ethyltrimethoxysilane, beta-(3,4 - epoxycyclohexyl)propyltrimethoxysilane gamma-(3,4 - epoxycyclohexylpropyltriethoxysilane, beta-(4,5 - epoxycycloheptyl)ethyltrimethoxysilane, beta-(2,3-epoxycylcoheptyl)ethyltripropoxysilane, delta-(2,3 - epoxycycloheptyl)butyltripropoxysilane, and the like; (b) a glycidoxyalkyltrialkoxysilane such as gamma-glycidoxypropyltrimethoxysilane, beta - glycidoxyethyltributoxysilane, delta-glycidoxybutyltriethoxysilane, gamma - glycidoxyoctyltripropoxysilane, and the like; (c) an acryloxy)alkyltrialkoxysilane such as gama-(methacryloxy)propyltrimethoxysilane, gamma-(ethacryloxy)propyltrimethoxysilane, gama - (acryloxy)propyltriethoxysilane, beta-(methacryloxy)ethyltriethoxysilane, gamma - (methacryloxy)butyltripropoxysilane, delta - (methacryloxy)butyltriethoxysilane, and the like; (d) an alkenyltrialkoxysilane such as vinyltriethoxysilane, allyltriethoxysilane, butenyltrimethoxysilane, vinyltributoxysilane, and the like; and (e) an aminoalkyltrialkoxysilane (including the N-hydroxyalkyl- and the N-aminoalkyl-substituted compounds) such as gamma-aminopropyltriethoxysilane, gamma - aminopropyltrimethoxysilane, beta-aminoethyltributoxysilane, N - beta - (hydroxyethyl)-gamma-aminopropyltriethoxysilane, N,N-bis-(beta-hydroxyethyl)-gamma-aminopropyltriethoxysilane, N - beta - (aminoethyl)-gamma-aminopropyltrimethoxysilane, N-gamma-(aminopropyl) - gamma - aminopropyltriethoxysilane, N-beta-(aminoethyl)-delta-aminobutyltriethoxysilane, and the like.

In order to be suitable for the purposes of the present invention the glass substrate must be fibrous; however, any form of fibrous glass can be employed. Suitable are woven cloth, chopped mat, continuous strand mat, chopped strand, roving, woven roving, and the like. Powdered glass is not suitable.

The fibrous glass can be treated, i.e., sized with the organofunctional silane, in any convenient manner. The silane can be applied to the glass fibers at the extrusion bushing as the glass fibers are produced, or the sizing can be carried out by means of an aqueous solution of the proper silane into which the glass fibers are dipped and subsequently dried. In the latter case the silane is deposited on the glass fiber as the corresponding hydrolyzate.

It will be apparent to one skilled in the art that the materials actually deposited on the fibrous glass from aqueous solutions are the silane derived hydrolyzates rather than the silanes as such. The hydrolyzates are siloxanes, e.g., an aqueous solution of beta-(3,4-epoxycyclohexyl)ethyltrimethoxysilane deposits on the glass fibers as beta-(3,4-epoxycyclohexyl)ethylsiloxane. Also, during hydrolysis the epoxy ring may open to produce the corresponding hydroxycyclohexylethylsiloxane.

The silane loading on the glass fibers must be sufficient to enhance the flexural strength of the ultimate thermoformed article. While for practical applications the loading is usually expressed in terms of weight percent, based on the weight of the treated glass fibers, it must be recognized that the minimum loading requirement may vary depending on the surface area of the particular glass fibers that are employed. When fibrous glass having a surface area of from about 0.1 to about 0.2 square meter per gram is employed, the effective silane loading can range from about 0.01 to about 5 weight percent, based on the weight of the treated fiber. Preferably the silane loading is in the range from about 0.1 to about 0.75 weight percent.

The silane-treated glass is ready for contacting with the polyolefin resin. However, if polypropylene is the polyolefin, a still further enhancement of physical properties can be achieved when the silane-treated glass is treated with a solution of an organic peroxide so as to deposit on the glass fibers from about 0.05 to about 5 weight percent, based on the weight of the fiber. The amount deposited preferably is in the range from about 0.15 to about 1.5 weight percent. As can be seen from the examples below, the peroxide treatment synergetically enhances the flexural strength of the ultimate article when the resin is polypropylene.

Typical organic peroxides that can be employed for this purpose are the diacyl peroxides such as benzoyl peroxide, bis-(2,4-dichloro)benzoyl peroxide, bis-(parachloro)benzoyl peroxide, and the like; the peroxy esters such as tert.-butyl peroxyacetate, tert.-butyl peroxybenzoate, and the like; the alkyl peroxides such as dicumyl peroxide, 2,5-dimethyl-2,5-bis-(tert.-butylperoxy)hexane, and the like; the hydroperoxides such as tert.-butyl hydroperoxides, alpha-cumyl hydroperoxide, and the like, the ketone peroxides such as methylethyl ketone peroxide, cyclohexanone peroxide, and the like.

Typical organic solvents that can be employed in preparing the peroxide solutions are the aromatic solvents such a toluene, benzene, and the like; the aliphatic alcohols such as ethanol, propanol, and the like; the dialkyl ethers such as diethyl ether, and the like, carbon disulfide, etc. The proper solvent in any given instance can be ascertained by no more than routine experimentation.

The silane-treated glass and the polyolefin can be brought in intimate contact with each other in any convenient manner and then thermoformed. The term "thermoforming," as used herein and in the appended claims, is taken to mean the transformation of the resin-silane-glass composite into useful shapes by means of heat and/or pressure. Illustrative thermoforming processes are molding, extrusion, hot calendering, casting, vacuum forming, and the like.

Several methods of achieving intimate contact between the treated fibrous glass and the polyolefin resin are illustrated by the examples below. Still other methods include the utilization of resin film or sheet and the preparation therefrom of a dry laminate having alternating plies of fibrous glass and resin which is then molded, the admixture of chopped, silane-treated glass fibers with warm or hot, fluid resin in a mechanical mixer prior to extrusion, the calendering of the resin onto a treated glass cloth or mat, and the like.

The examples below further illustrate the present invention. Glass reinforcement in the form of woven glass fabric was used in all examples. The fabric was a satin weave cloth having a thickness of 10 mils, weighing about 8.9 ounces per square yard, having 57 x 54 ends and picks per square inch and having a breaking strength of 375 x 350 pounds per square inch. The fabric had the weaving size burned off in a heat cleaning operation. The control in all instances comprised resin reinforcement with cloth having had no silane treatment.

The thermoplastic polyolefin resin employed in these examples was a commercial grade of low density polyethylene in the form of 0.010 inch sheet or polypropylene film about 0.001 inch thick.

Example I

This example shows a comparison of the effect on the flexural strength of a glass reinforced polyethylene composite. The fibrous glass reinforcement was treated with gamma-methacryloxypropyltrimethoxysilane. The silane was applied to the glass in the following manner:

An aqueous treating bath containing about one weight percent gamma-methacryloxypropyltrimethoxysilane was prepared by adding the silane to water adjusted to pH 3.5–5 with acetic acid and gently stirring until the silane hydrolyzed. A clear colorless solution resulted. Ten inch-wide strips of the glass fabric were passed through the treating solution, dried at room temperature, and then placed in an oven for about two and one-half minutes at about 135° C. (275° F.). The glass fabric was observed to pick up about one-half of its weight of the treating solution. After evaporation of the solvent there remained a coating on the fabric equivalent to 0.5 weight percent of the silane, based on the weight of the fabric.

The silane treated glass fabric and the 0.010 inch thick polyethylene sheet were cut into 10" x 10" squares. A dry laminate of alternating plies of resin and glass was constructed utilizing 11 plies of silane treated glass and 12 plies of polyethylene sheet. This dry laminate was placed in a press preheated to about 204° C. (400° F.) and pressed to 0.125 inch stops. The resulting composite was molded for about 20 minutes under these conditions, the press cooled, and the composite removed.

A second composite was prepared by the same procedure except untreated glass fabric was used as reinforcement.

Flexural strength test specimens of approximately 4" x ½" x ⅛" were cut from both composites and the flexural strength determined according to ASTM method D–790–61. Specimens from each composite were divided into several groups. Group 1 was tested at room temperature, Group 2 at room temperature after the specimens had been immersed in water at about 50° C. (122° F.) for 16 hours and Group 3 was tested at about 71° C. (160° F.). The flexural strengths are given in Table I, below.

Example II

In a manner similar to Example I polyethylene was reinforced with fibrous glass treated with beta-(3,4-epoxycyclohexyl)ethyltrimethoxysilane which was applied to the glass from a 75–25 water-ethanol solution. The flexural strengths of the resulting composite under the indicated conditions are given in Table I, below.

Example III

In a manner similar to Example I polyethylene was reinforced with fibrous glass treated with gamma-glycidoxypropyltrimethoxysilane which was applied to the glass from a water solution. The flexural strengths of the resulting composite under the indicated conditions are given in Table I, below.

Example IV

In a manner similar to Example I polyethylene was reinforced with fibrous glass treated with gamma-aminopropyltriethoxysilane. The flexural strengths of the resulting composite under the indicated conditions are given in Table I, below.

Example V

In a manner similar to Example I polyethylene was reinforced with fibrous glass treated with vinyltriethoxysilane. The flexural strengths of the resulting composite under the indicated conditions are given in Table I, below.

TABLE I

| Silane Composition | Wt. percent | Flexural Strength (p.s.i.×10⁻³) | | |
|---|---|---|---|---|
| | | Room temp. | Wet | 71° C. (160° F.) |
| Control | | 10.2 | 6.4 | 4.7 |
| Gamma-(methacryloxy) propyltrimethoxysilane | 0.5 | 19.9 | 16.3 | 7.5 |
| Beta-(3,4-eopxycyclohexyl)ethyltrimethoxysilane | 0.5 | 12.3 | 11.1 | 6.0 |
| Gamma-glycidoxypropyl-trimethoxysilane | 0.5 | 11.0 | 10.0 | 5.5 |
| Gamma-aminopropyltriethoxysilane | 0.5 | 14.8 | 12.6 | 8.4 |
| Vinyltriethoxysilane | 0.5 | 15.7 | 16.6 | 8.4 |

The above experimental results indicate that a substantial improvement in the flexural strength is achieved when polyethylene is reinforced with silane-treated fibrous glass.

Example VI

This example shows a comparison of the effect on the flexural strength of a glass reinforced polypropylene composite. The fibrous glass reinforcement was treated with gamma-methacryloxypropyltrimethoxysilane. The silane was applied to the glass in the following manner:

An aqueous treating bath containing about one weight percent gamma-methacryloxypropyltrimethoxysilane was prepared by adding the silane to water adjusted to pH 3.5–5 with acetic acid and gently stirring until the silane hydrolyzed. A clear colorless solution resulted. Ten inch-wide strips of the glass fabric were passed through the treating solution, dried at room temperature, and then placed in an oven for about two and one-half minutes at about 135° C. (275° F.). The glass fabric was observed to pick up about one-half of its weight of the treating solution. After evaporation of the solvent there remained a coating on the fabric equivalent to 0.5 weight percent of the silane, based on the weight of the fabric.

The polypropylene-glass composite was prepared in the following way:

The silane treated glass and the polypropylene film were cut into 10" x 10" squares and a dry laminate prepared by stacking 10 plies of the 0.001 inch polypropylene film, 1 ply of silane-treated glass cloth. This process was continued until the composite contained 12 units of 10 plies of 0.001-inch polypropylene and 11 plies of silane-treated glass cloth. The dry laminate was placed in a press preheated to about 204° C. (400° F.) and pressed to 0.125 inch stops. The resulting composite was molded for about 20 minutes under these conditions, the press cooled and the composite removed.

A second composite was prepared by the same procedure except untreated glass fabric was used as reinforcement.

Flexural strength test specimens of approximately 4" x ½" x ⅛" were cut from both composites and the flexural strength determined according to ASTM method D–790–61. Specimens from each composite were divided into several groups. Group 1 was tested at room temperature and Group 2 at room temperature after the specimens had been immersed in water at about 50° C. (122° F.) for 16 hours and Group 3 was tested at about 93° C. (200° F.). The flexural strengths are given in Table II, below.

In a manner similar to above other silanes were employed to treat the fibrous glass used as the reinforcement for polypropylene. The silanes and the test results are also compiled in Table II, below.

TABLE II

| Silane Composition | Wt. percent | Flexural Strength (p.s.i.×10⁻³) | | |
|---|---|---|---|---|
| | | Room temp. | Wet | 93° C. (200° F.) |
| Control | | 12.7 | 9.6 | 5.5 |
| Gamma-aminopropyltriethoxysilane | 0.5 | 21.8 | 14.3 | 12.6 |
| Gamma-(methacryloxy)-propyltrimethoxysilane | 0.5 | 17.9 | 16.9 | 10.3 |
| Beta-(3,4-epoxycyclohexyl)ethyltrimethoxysilane | 0.5 | 16.0 | 15.9 | 8.0 |
| Gamma-glycidoxypropyltrimethoxysilane | 0.5 | 12.0 | 10.7 | 6.4 |
| Vinyltriethoxysilane | 0.5 | 16.0 | 15.7 | 9.5 |
| N,N-bis(beta-hydroxyethyl)-gamma-aminopropyltriethoxysilane | 0.5 | 16.1 | 13.2 | 7.4 |
| N-beta-(aminoethyl)-gamma-aminopropyltrimethoxysilane | 0.5 | 16.7 | 13.0 | 10.5 |

The above experimental results indicate that a substantial improvement in the flexural strength is achieved when polypropylene is reinforced with silane-treated fibrous glass.

TABLE III [1]

| Silane [2] | Peroxide | | Flexural Strength (p.s.i.×10⁻³) | | |
|---|---|---|---|---|---|
| | Name | Wt. percent [3] | Room temp. | Wet [4] | 93° C. (200° F.) |
| Control | | | 13.2 | 10.0 | 4.8 |
| Gamma-(methacryloxy)-propyltrimethoxysilane | | | 19.9 | 16.5 | 8.8 |
| Vinyltriethoxysilane | | | 16.0 | 15.7 | 9.5 |
| Control | Dicumyl | 0.15 | 16.3 | 12.1 | 7.1 |
| Do | do | 0.30 | 17.0 | 11.2 | 8.3 |
| Do | do | 0.60 | 16.3 | 9.8 | 8.6 |
| Do | do | 1.50 | 13.7 | 7.8 | 12.2 |
| Gamma-(methacryloxy)-propyltrimethoxysilane | do | 0.15 | 31.8 | 29.7 | 18.5 |
| Do | do | 0.60 | 31.6 | 30.6 | 17.1 |
| Do | do | 1.50 | 27.7 | 21.9 | 20.6 |
| Vinyltriethoxysilane | do | 1.50 | 29.0 | 25.5 | 20.4 |
| Control | ([5]) | 1.0 | 18.6 | 9.8 | 13.5 |
| Gamma-(methacryloxy)-propytrimethoxysilane | ([5]) | 1.0 | 22.5 | 18.3 | 17.1 |
| Vinyltriethoxysilane | ([5]) | 1.0 | 20.0 | 16.2 | 13.0 |

[1] These laminates were prepared from 11 plies of glass fabric and commercial polypropylene film. The peroxides were applied to the glass from a solvent solution after application of the silane. Molding was carried out at about 204° C. (400° F.) for about 20 minutes.
[2] Silanes were applied at a loading of 0.5 wt. percent based on the weight of glass cloth.
[3] Peroxide loadings are based on the weight of glass cloth.
[4] Samples immersed for 16 hours in water at about 49° C. (120° F.) and tested at room temperature.
[5] 2,5-dimethyl-2,5-di(tert.-butylperoxy)hexane.

Example VII

In a manner similar to Example VI various silanes were employed to treat fibrous glass used as reinforcement for polypropylene. After the silane treatment the glass fibers were further treated with a toluene solution of an alkyl peroxide, the toluene being subsequently removed from the glass fibers by evaporation. Thereafter the test composites were prepared in accordance with the procedure set forth in Example VI, above. The test results and conditions are set forth in Table III, above.

Data in Table III indicate that the presence of a peroxide exerts a beneficial synergetic effect on the flexural strength of the ultimate polypropylene article reinforced with silane-treated fibrous glass.

We claim:

1. A method for reinforcing substantially fully polymerized ethylene or propylene polymer resin which comprises (1) providing a fibrous glass substrate, (2) treating the glass substrate with an organofunctional aliphatic trialkoxysilane which is a member of the group consisting of an (epoxycycloalkyl)alkyltrialkoxysilane, a glycidoxyalkyltrialkoxysilane, and an (acryloxy)alkyltrialkoxysilane, so as to deposit thereon said silane or a hydrolyzate thereof, (3) intimately contacting the treated glass substrate with the ethylene or propylene polymer resin, and (4) thermoforming the resulting composite at a temperature below the decomposition temperature of the resin and the silane; the amount of silane deposited on the glass fiber being sufficient to enhance the flexural strength of the thermoformed composite.

2. The method in accordance with claim 1 wherein the organofunctional aliphatic trialkoxysilane is gamma-(methacryloxy)propyltrimethoxysilane or the corresponding hydrolyzate thereof.

3. The method in accordance with claim 1 wherein the organofunctional aliphatic trialkoxysilane is beta-(3,4-epoxycyclohexyl)ethyltrimethoxysilane or the corresponding hydrolyzate thereof.

4. The method in accordance with claim 1 wherein the organofunctional aliphatic trialkoxysilane is gamma-glycidoxypropyltrimethoxysilane or the corresponding hydrolyzate thereof.

5. The method in accordance with claim 1 wherein the resin is polypropylene and the fibrous glass treated with the organofunctional aliphatic trialkoxysilane is treated with an organic peroxide prior to intimate contact with the resin.

6. An article of manufacture which is a thermoplastic composite of fibrous glass, an ethylene or propylene polymer resin, and a hydrolyzate of an organofunctional aliphatic trialkoxysilane selected from the group consisting of an (epoxycycloalkyl)alkyltrialkoxysilane, a glycidoxyalkyltrialkoxysilane, and an (acryloxy)alkyltrialkoxysilane.

7. An article of manufacture in accordance with claim 6 wherein the organofunctional aliphatic trialkoxysilane is gamma-(methacryloxy)propyltrimethoxysilane.

8. An article of manufacture in accordance with claim 6 wherein the organofunctional aliphatic trialkoxysilane is beta - (3,4 - epoxycyclohexyl)ethyltrimethoxysilane.

9. An article of manufacture is accordance with claim 6 wherein the organofunctional aliphatic trialkoxysilane is gamma-glycidoxypropyltrimethoxysilane.

References Cited

UNITED STATES PATENTS

| | | | |
|---|---|---|---|
| 3,013,915 | 12/1961 | Morgan | 161—168 X |
| 3,306,800 | 2/1967 | Plueddemann | 161—193 X |
| 3,350,345 | 10/1967 | Vanderbilt | 161—193 |

ROBERT F. BURNETT, Primary Examiner.

J. D. FOSTER, Assistant Examiner

U.S. Cl. X.R.

117—76, 126; 161—193; 264—90, 175